United States Patent [19]
Beardsley et al.

[11] Patent Number: 5,991,775
[45] Date of Patent: *Nov. 23, 1999

[54] METHOD AND SYSTEM FOR DYNAMIC CACHE ALLOCATION BETWEEN RECORD AND TRACK ENTRIES

[75] Inventors: Brent Cameron Beardsley; Lawrence Carter Blount; Joel Harvey Cord; Michael Howard Hartung; Vernon John Legvold, all of Tucson, Ariz.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 07/949,669

[22] Filed: Sep. 23, 1992

[51] Int. Cl.⁶ .................................................. G06F 12/02
[52] U.S. Cl. ................................. 707/205; 711/3; 711/4; 711/113; 711/173
[58] Field of Search .................................. 395/600, 425; 364/DIG. 1; 707/205; 711/113, 118, 160, 173, 3, 4, 205, 208

[56] References Cited

U.S. PATENT DOCUMENTS

| | | | |
|---|---|---|---|
| 4,464,713 | 8/1984 | Benhase et al. | 711/205 |
| 4,499,539 | 2/1985 | Vosacek | 707/205 |
| 4,571,674 | 2/1986 | Hartung et al. | 711/160 |
| 4,603,380 | 7/1986 | Easton et al. | 711/113 |
| 4,603,382 | 7/1986 | Cole et al. | 710/56 |
| 4,633,387 | 12/1986 | Hartung et al. | 395/675 |
| 4,636,946 | 1/1987 | Hartung et al. | 711/136 |
| 4,779,189 | 10/1988 | Legvold | 711/166 |
| 4,967,353 | 10/1990 | Brenner et al. | 711/160 |
| 5,155,845 | 10/1992 | Beal et al. | 364/236.2 |
| 5,206,939 | 4/1993 | Yanai et al. | 711/4 |
| 5,226,141 | 7/1993 | Esbensen | 711/171 |
| 5,235,692 | 8/1993 | Beardsley et al. | 711/113 |
| 5,390,318 | 2/1995 | Ramakrishnan et al. | 711/158 |

*Primary Examiner*—Jean R. Homere
*Attorney, Agent, or Firm*—Dan A. Shifrin; Andrew J. Dillon

[57] ABSTRACT

A data storage system provides generalized record caching through a control unit adapted to support track caching in the upper level store of a two level memory. Dynamic reallocation of space between each type of caching in the upper store follows operating patterns of host computer systems using the data storage system. A storage controller cache has a plurality of segments. A directory data entry data structure is allocated each segment. Such allocated directory entries are used to identify tracks as cached. A plurality of unallocated directory entries are also provided. As a record is cached in a segment outside of a track slot, an unallocated directory entry is used to identify a virtual track in cache corresponding to the track of the record in the lower level store. Records from one track can thus appear in several segments outside track slots. Tracking of records to locate records least recently used is done globally over all track slots and record caching segments and locally within individual record caching segments. A mechanism is provided for identifying record slots, as they become least recently used, and dropping them from the upper level store in the face of competing demands for the space. A second mechanism identifies least recently used segments for dropping from the upper level store.

12 Claims, 8 Drawing Sheets

METHOD AND SYSTEM FOR DYNAMIC CACHE ALLOCATION BETWEEN RECORD AND TRACK ENTRIES

BACKGROUND OF THE INVENTION

1. Technical Field

The invention relates to data processing, and more particularly relates to data processing systems having two or more levels of data storage in a data storage system. Still more particularly, the invention relates to a method of caching data from a lower level of storage on a higher level of storage both as individual records and in whole tracks.

2. Description of the Related Art

Common architectures for computers have two or more levels of storage for data and provide for direct processor access to data resident in faster, smaller memory in the upper levels. A second level of data storage is generally much larger but slower than memory and generally contains copies of virtually all records and programs used on a computer.

Main frame computer systems generally use auxiliary storage devices in the lower levels. In auxiliary storage devices data is recorded by making a physical change to a medium. Examples of physical storage of data on media are: pitting of aluminum by lasers; grooving of plastic disk by a needle; and forming magnetic domains on a magnetic surface with an electromagnet. A transducer can then be used to sense the physical qualities of the media and to produce an electrical signal which varies in correspondence to the physical qualities of the media. For a data processing system, the electrical signal is decoded to reproduce binary data.

Direct Access Storage Devices (DASD, pronounced "dasdee") are one type of auxiliary storage device. In a direct access storage device access time to data is independent of the location of the data in the storage device. Presently, disk drive units are the most common type of DASD. A disk drive unit records data on rotatable disks. The write and read transducers are moved radially inward and outward relative to the disk as the disk is rotated to bring any location of the disk and the appropriate transducer into proximity with one another.

The fact that access time to a location on a disk is more or less random does not mean that it is instantaneous. During a period when a DASD waits for a spinning disk to move to the correct position for a transducer to access a location, a storage controller for the DASD can perform other functions. An example of a function performed during a waiting period is the downloading of data from a buffer memory to a channel to a host computer. In large, multiple computer data processing systems, such as those serving airline reservation systems, a large number of direct access storage devices serve several computers. The storage controller is logically positioned between the DASDs and the host computers. The storage controller handles connection and disconnection between a particular computer and magnetic disk unit for transfer of data.

The IBM 3990 storage controller is an example of a storage controller used to control connections between magnetic disk units and host computers. The IBM 3990 Model 3 type controller, which is available from IBM Corporation, can handle up to sixteen channels from host computers and up to sixty-four magnetic storage units. Within the storage controller are two multipath storage directors and four storage paths, two of which are associated with each multipath storage director. Each multipath storage director may be connected to up to eight incoming channels from host computers, for a total of sixteen channels for the storage controller as a whole. Each multipath storage director is connected to two storage paths, thus functioning as an 8×2 switch.

Channels are physical links between the storage controller and the host computers. Usually, a host computer has two or four channels, half being physically connected to the one multipath storage director and the other half being connected to the other multipath storage director. Each storage path leads to all of the available magnetic disk units. Upon indication that a disk is ready, the controller can secure any one of a plurality of the channels and storage paths back to a host to establish a data path.

Each storage path is in effect a stand alone control unit based upon its own microprocessor. The storage paths share control information through a common memory space for synchronization functions relating to handling connections, disconnections and reconnections relating to a transaction. Each storage path in a storage control unit has access to two addressable memory devices used for supporting storage control unit operation. The memory devices are a shared control array (SCA) and a cache.

Cache is best known for its application as an adjunct to computer memory. Cache is used as a high speed storage for frequently accessed instructions and data. The length of time since last use of a record is used as an indicator of frequency of use in determining continued residency in cache. In main computer memory, program data has to be released before data competing for space can gain access. In cache, competition for space results in data falling out of the cache when they become the least recently used data. While infrequently accessed data periodically enter cache, they will tend to "age" and fall out of cache. The contents of cache are duplicated in system memory. Various data structures must be maintained to operate a memory device as a cache memory. A primary logical data structure used for the functions is a doubly chained most recently used/least recently used list for records.

Storage controller cache performs an analogous function between direct access storage devices and host computers. Reading data from (and writing data to) the magnetic media of the direct access storage devices is fairly time consuming. Among the factors slowing the read and write operations are time required for the magnetic disk to come to the appropriate position and the limited bandwidth of the magnetic transducers used to read and write the data. By placing frequently accessed records in cache, access time for data and connection time by host computers is reduced and data storage system throughput is considerably enhanced. Because high speed components are expensive in terms of cost per byte of storage, particularly when compared with magnetic media storage cache is quite small compared to the memory device for which it acts as a buffer.

In the IBM 3990 Model storage controller, data is conventionally stored to storage controller cache by track images. In fast write operations, each track image corresponds to the contents of a physical track from a direct access storage device. Where a track image is present in cache, a write command from a host computer updating a record of the track results in the record being written over the corresponding record in the track image rather than to DASD. Time is saved over waiting for the disk to come to the correct position for direct transfer of the data from the host computer. Then, as a background process, the storage controller can transfer data from cache to disk to update a record.

However, the storage of whole track images in storage controller cache is inefficient in terms of storage capacity utilization in some applications. Another approach has been to cache records, which reduces internal fragmentation in the cache at the expense of greater complexity in data structures required. Certain performance advantages go with each approach to caching. Caching systems which worked both with tracks and records have been avoided as promising excessive complexity.

SUMMARY OF THE INVENTION

It is one object of the invention to provide an improved data processing system having two or more levels of data storage in a data storage system.

It is still another object to provide a method of caching data from a lower level of storage on a higher level of storage both as individual records and in whole tracks.

A data storage system provides generalized record caching through a control unit adapted to support track caching in the upper level store of a two level memory. Dynamic reallocation of space between record and track caching in the upper level store follows operating patterns of host computer systems using the data storage system. A storage controller cache has a plurality of segments. A directory entry data structure is allocated each segment. Such allocated directory entries are used to identify tracks as cached. A plurality of unallocated directory entries are also provided. As a record is cached in a segment outside of a track slot, an unallocated directory entry is used to identify a virtual track in cache corresponding to the track of the record in the lower level store. Records from one track can thus appear in several segments outside track slots. Ordinal ageing of records to locate the records least recently used is done globally over all track slots and record caching segments. Ageing of records locally within individual record caching segments is also done. Least recently used segments are dropped from the upper level store upon demand for the space they occupy. Record slots within record caching segments are checked for deallocation upon each access to the segment. Record slots whose last use precedes the time stamp of the most recently deallocated segment are deallocated.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
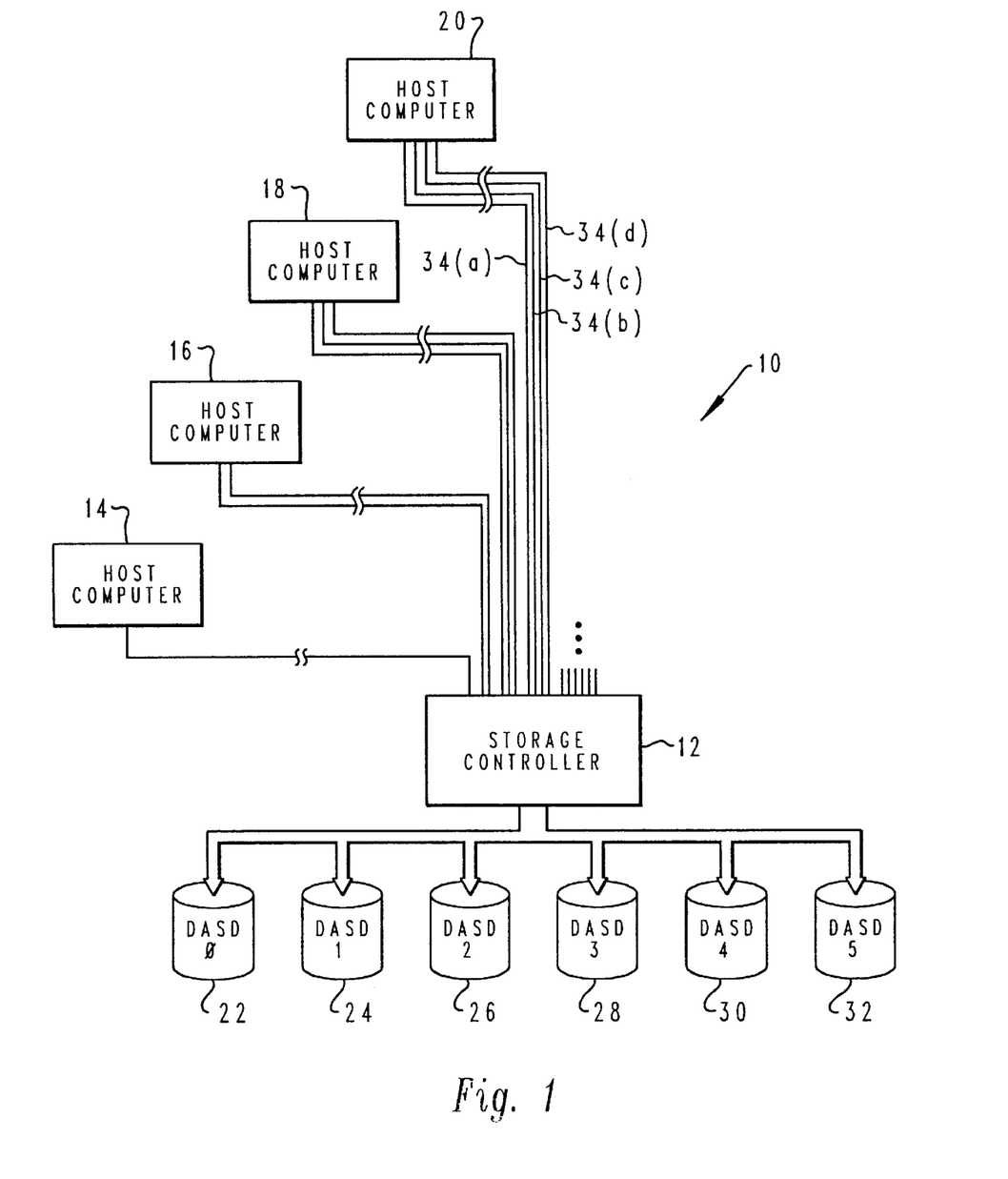
FIG. 1 is a block diagram of a data processing system which may be utilized to implement the method and system of the present invention.

With reference now to the figures and in particular with reference to FIG. 1, there is depicted a high level block diagram of a data processing system 10. Data processing system includes a storage controller 12, a plurality of host computers 14, 16, 18 and 20 and a plurality of direct access storage devices (DASD) 22–32. Direct access storage units 22–32 are generally magnetic storage units, such as disk drives. Storage units 22–32 are also connected to storage controller 12 for selective connection for communication with host computers. Storage controller 12 is preferably an IBM 3990 Model 3 type controller, which is available from IBM Corporation. Host computers 14–20 are typically main frame systems such as the IBM 3090, the ES9000 Model computer, or comparable systems. Host computers 14–20 are connected to storage controller 12 with at least one and up to four channels. For example, host computer 20 is connected to storage controller 12 by channels 34(a), 34(b), 34(c) and 34(d). The channels come in two types, parallel data channels and serial data channels. Certain optical serial channels are used for data transmission up to 20 kilometers. Parallel channels utilize electrical signals and are generally not used at distances of greater than about 125 meters.

Figure 2:
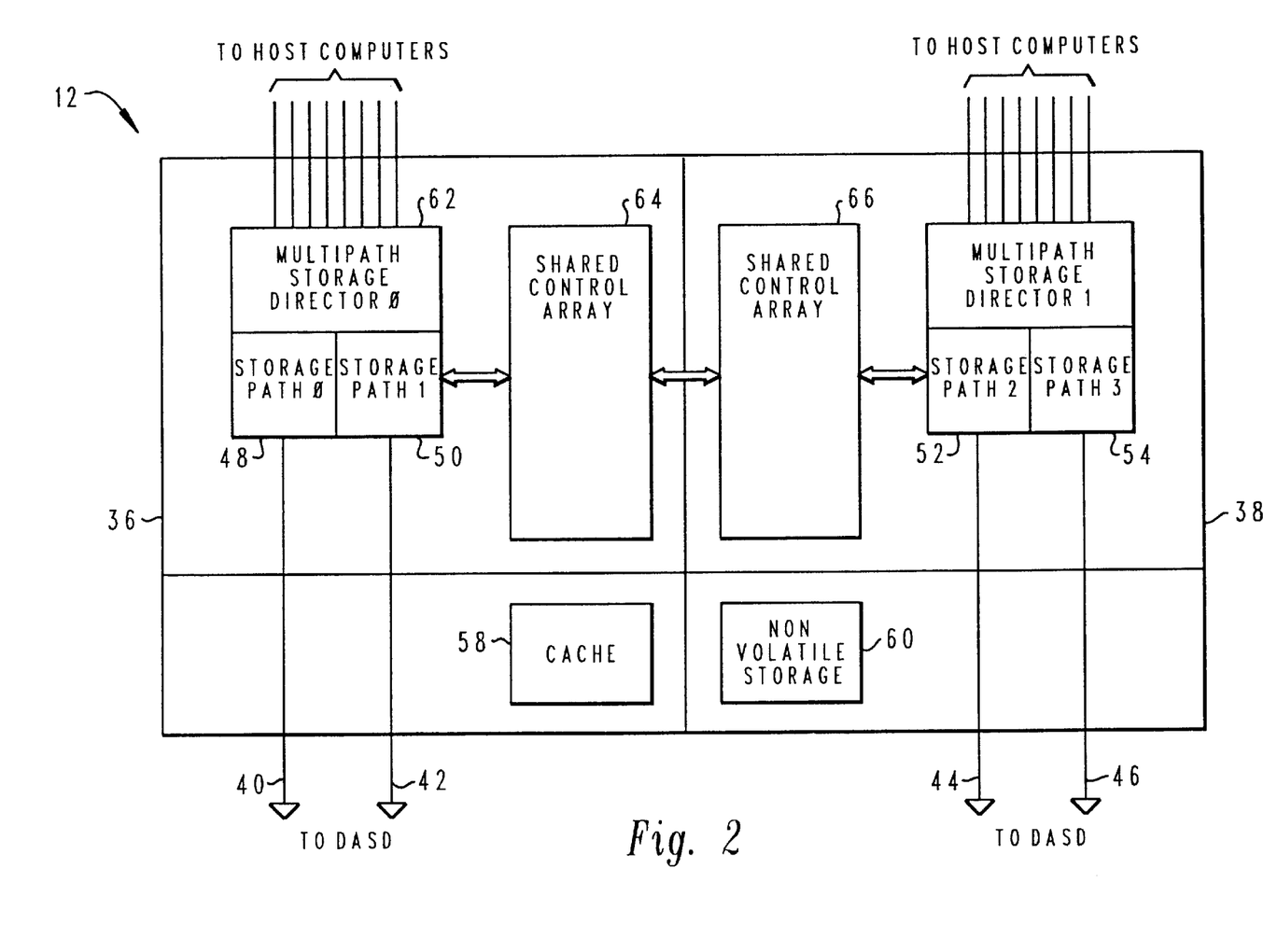
FIG. 2 is a block diagram of a storage controller from the data processing system of FIG. 1.

FIG. 2 depicts storage controller 12 in greater detail. Storage controller 12 has two storage clusters 36 and 38, each of which provides for selective connection between a host computer and a direct access storage device. Although four host computer systems and six direct access storage devices are depicted in FIG. 1, storage controller 12 can handle additional channels and direct access storage devices.

Data from a given host computer system may be stored to any of the direct access storage devices. Data may also be recovered from any of the direct access storage devices for a given host computer. Where a host computer is connected by at least two channels, one each is connected to storage clusters 36 and 38. Similarly, where four channels are provided, two are connected to storage cluster 36 and two to the second to storage cluster 38. Storage controller 12 may receive a request from a host computer over a channel, and respond to the request over any one of the channels connected to the same host computer. The channels associated with one host computer are known as a path group. Storage controller 12 has knowledge of the path groups, having received the information from each host computer.

Storage controller 12 has four paths 40, 42, 44 and 46 to the direct access storage devices. Each data path 40–46 is associated with one of storage path processors 48–54, respectively. Each data path goes to all of the direct access storage devices. Only one data path has access to a direct access storage device at a time however. Because storage controller 12 attempts to synchronize disconnects and reconnects between direct access storage devices and host computers based upon rotational position of a disk in the direct access storage device, storage controller 12 may be seen to operate, in essence, as a data transfer traffic manager. An object of the traffic management scheme is to respond to requests received over the channels to the host computers as quickly as possible. One way to meet this objective is to keep the storage path processors occupied with data moving between host computers and direct access storage devices.

Storage controller 12 is internally divided into sections corresponding independent power supplies. Two sections are storage clusters 36 and 38, respectively. A third section includes a memory cache 58. A fourth section includes a nonvolatile storage 60. Cache 58 provides storage for frequently accessed data and for the buffering functions in order to provide similar response times for cache writes and cache reads. Nonvolatile storage 60 is used for temporary storage of data being written to cache 58 until destaged to a DASD. Storage of data in nonvolatile storage allows indication to a host that the storage operation is logically complete, notwithstanding the fact that actual transfer of the data to a direct access storage device has not yet been completed.

Storage clusters 36 and 38 mirror one another in terms of functional features. Accordingly only storage cluster 36 is described here. Storage cluster 36 includes a multipath storage director 62 which operates as a four or eight by two switch between the channels from the host computer systems and signal path processors 48 and 50. Storage cluster 36 also includes a shared control array 64, which duplicates the contents of shared control array 66 in storage cluster 38. Shared control arrays 64 and 66 store path group information as well as control blocks for the direct access storage devices. The shared control arrays may also be used for storage of some of the data structures utilized in controlling cache 58 and in practicing the method of the present invention, as described below. Data structures can also be stored in cache 58.

Figure 3:
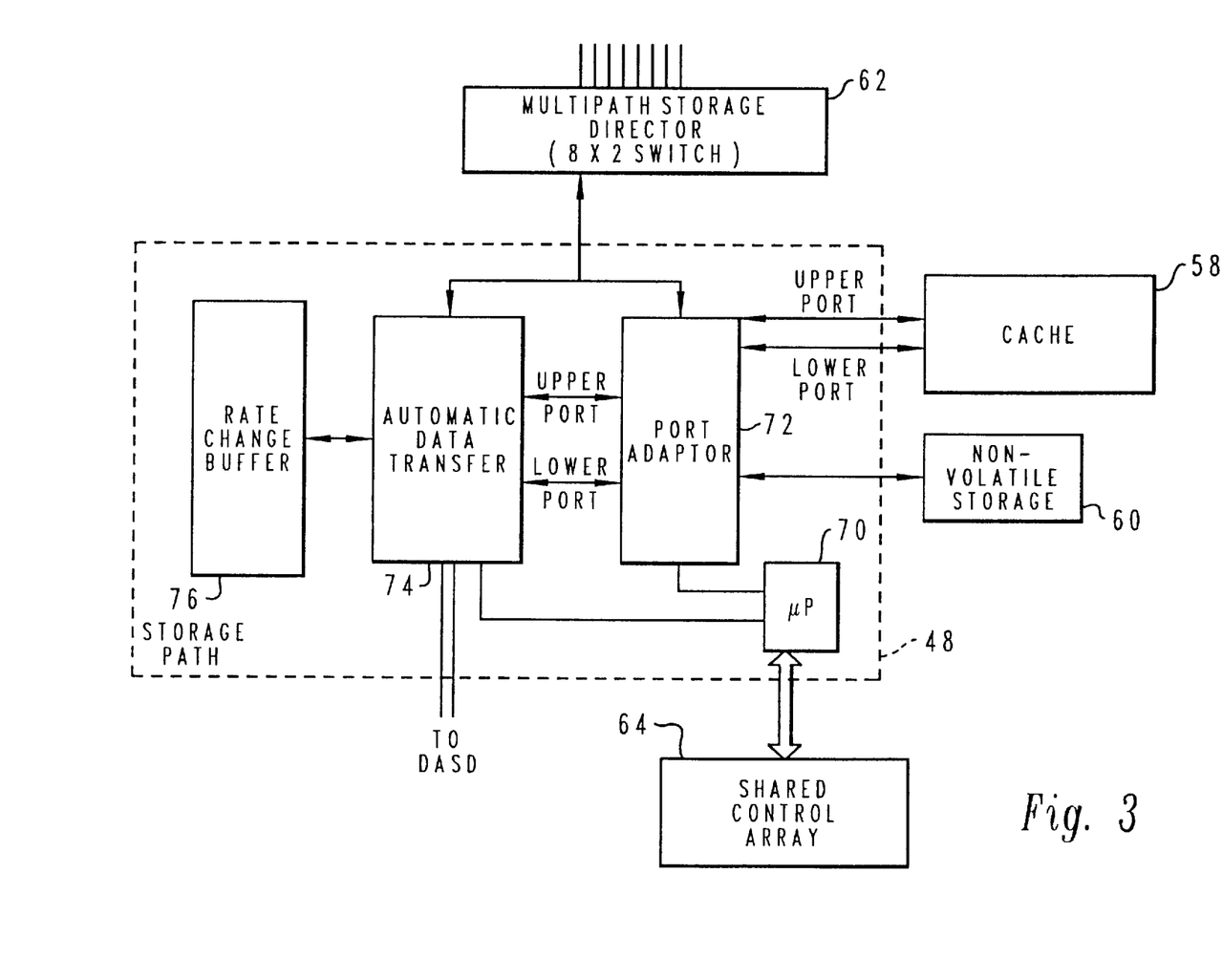
FIG. 3 is a block diagram of a storage path processor.

FIG. 3 illustrates storage path 48 in a block diagram schematic. Signal path processor 48 is connected out to multipath storage director 62 by an upper port and to a plurality of direct access storage devices by a lower port. Data transfer between the multipath storage director 62 and one of the direct access storage devices during synchronous operations occurs via an automatic data transfer circuit 74 supported by a rate change buffer 76, if required. Rate change buffer 76 compensates for differences between the speed of data transference by disk drive type direct access storage devices and the operating speed of the channels to host computers. The channels typically handle data at a faster rate than the direct access storage devices.

A port adapter 72 controls transfer of data between cache 58, nonvolatile storage 60 and the lower port. Port adapter 72 also controls transfer of data between cache 58 and the upper port. As discussed above, the presence of cache 58 and nonvolatile storage 60 provides for logical completion of certain data transfers without waiting for physical synchronization of disk and channel connection. All operations of signal path 48 are under control of a microcomputer 70. Before data transfer can begin, the DASD control must be oriented. It does that by detecting either the index point or the start-of-count area other than record zero. Once the count area, or index, has been detected, the device control can work its way down the track to perform the operations commanded by the channel program. After validating the locate record parameters, the control unit directs the device to seek to a first-specified track, positions the device to the designated sector, and begins a search operation to further position itself to a particular record area on the track.

Figure 4:
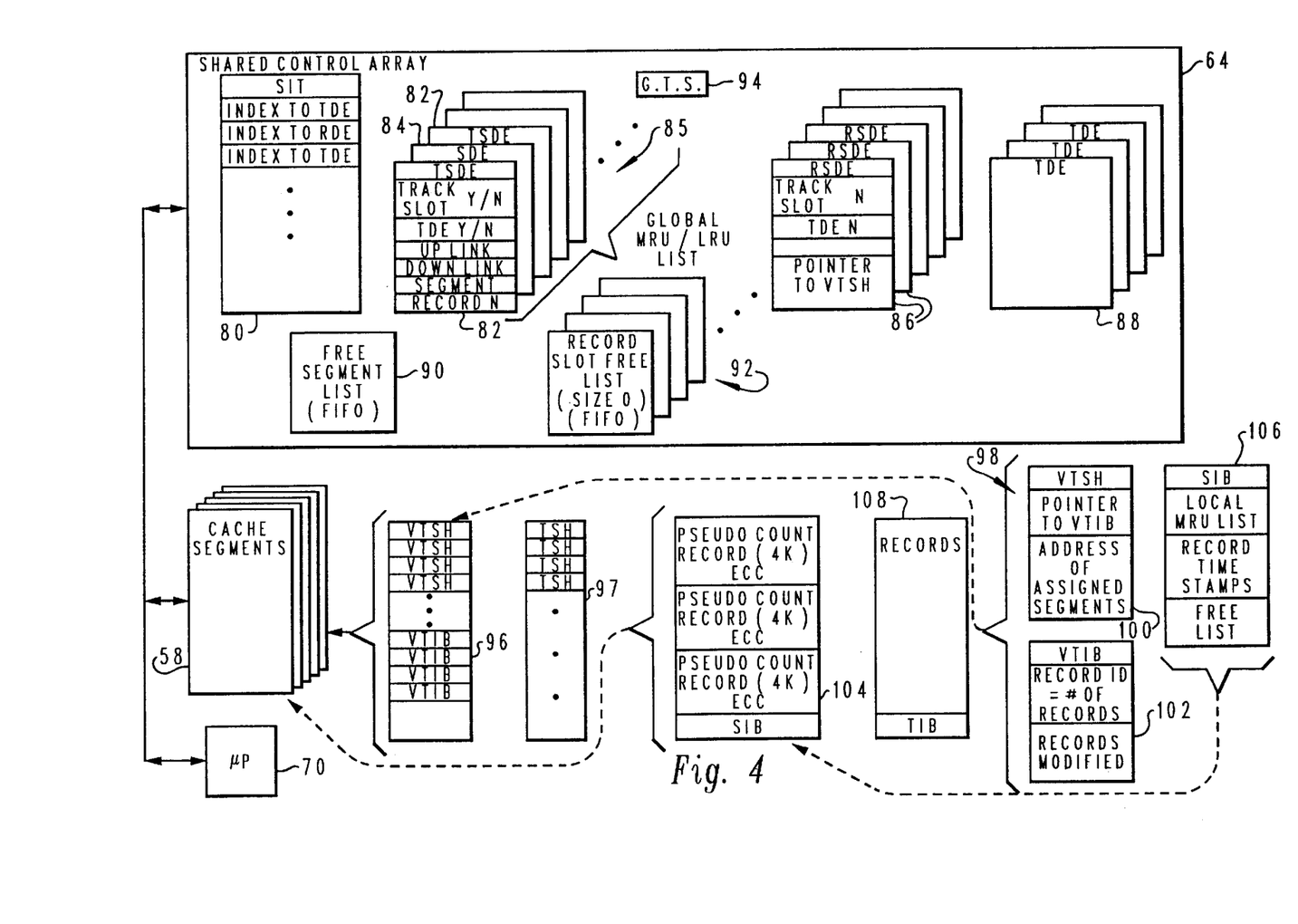
FIG. 4 is a schematic representation of a set of data structures used in controlling caching on a memory device in a storage controller for a plurality of disk drives.

FIG. 4 is a schematic representation of a set of data structures used by storage controller 12 to control caching of either records or tracks on cache 58. Several of the data structures are resident in shared control array 64. Among these are a scatter index table (SIT) 80. Scatter index table 80 is used to quickly determine whether data exists in cache or not. A hashing algorithm is processed by a microcomputer to convert a device number and physical address to a scatter index table entry. Hashing functions are well known techniques used to randomly allocate locations in one address space to addresses of a second address space. Those skilled in the art will realize that the usual techniques of hashing chains are used to resolve conflicts. Within the scatter index table are a plurality of indices to track directory entries 82 and record directory entries 86.

The structure of the various types of directory entries is linked to the segmented nature of the cache 58. Cache 58 is divided into 16 kilobyte segments. The segmentation functions are provided by addressing hardware which allows data records to span segments. For every field written to cache 58, 2 bytes of error detection and correction data are appended to the field. The implication for this is that a maximum of 3 records using 4 kilobyte data fields can be stored in a single 16 kilobyte segment. A directory entry is provided for each possible 16 kilobyte segment. While cache sizes as large as 256 megabytes are used in the IBM 3990 storage controller, a typical application has 64 megabytes available. A portion of the directory entries are associated on a one to one basis with cache segments. This leaves a substantial plurality of unallocated directory entries which the invention puts to other uses.

Directory entries come in four categories. Track slot directory entries 2 are directory entries which are addressed from the scatter index table, which appear in the doubly linked global most recently used/least recently used list 85 (i.e. they have pointers to a preceding and to a subsequent directory entry), which are permanently allocated to a segment and which are allocated to a selected track in a direct access storage device. A track slot directory entry 82 is used to define a track slot in cache. A track slot may consist of one or more segments of cache 58. A track slot directory entry will have associated track directory entries 88 if more than one segment is required for the track. The extra track directory entries 88 will not be addressed from the scatter index table and will not appear in the global most recently used/least recently used list 85. The track directory entries 88 will however come from the pool of directory entries allocated to segments in cache 58.

To provide for caching of records, a structure referred to as a record directory entry 86 is provided. A record slot directory entry 86 allows for record caching utilizing the basic structures and algorithms provided for addressing of tracks. A record slot directory entry 86 is reached from an index in the scatter index table 80. While a record slot directory entry 86 is linked with a track in a direct access storage device, not all of the records appearing on that track are required to actually be stored in cache. Record slot directory entries 86 are created from among the surplus directory entries not allocated to particular segments in cache 58. Another major difference between a record slot directory entry 86 and a track slot directory entry 82 is that a record slot directory entry 86 is not included in the doubly linked global most recently used/least recently used list.

An additional directory entry structure is used in connection with record caching. These are segment directory entries 84. Segment directory entries 84 come from the directory entries allocated to a segment. Segment directory entries 84 are also included in the global most recently used/least recently used list. However, records from different tracks may reside in a cache segment of a segment directory entry. Accordingly, a segment directory entry is not indexed in scatter index table 80.

Several other supplementary data structures are also resident in the shared control array 64. Among these are a free segment list 90 which is a first in first out linked list of segments of cache 58 that are available for assignment to a track slot or for record caching. A plurality of lists 92 of free records slots are also provided. Each of these lists is also in a linked, first in first out list indicating the location in cache of unused record slots. Finally a global time stamp 94 is maintained in the shared control array. Global time stamp 94 is used for operations relating to freeing of record slots.

Several control structures are provided in reserved portions of cache 58. The data structures in cache 58 include track slot headers and track information blocks. A track slot header from a pool 97 is assigned each track slot directory header 82 as created. A track slot header contains the addresses of the segments allocated to a track and is loaded from cache into the addressing hardware to access data. A track information block is also located in cache 58 for each valid track. The track information block is located from a pointer located in the track slot header and gives offsets to each record from the track. Data structure 108 indicates the organization of a cache segment allocated to a track slot. For the sake of simplicity it is assumed that a single segment is allocated for the track slot. Data structure 108 includes records, and at the end of the slot the track information block for the track slot.

Record caching is somewhat more complex. Upon assignment of an unallocated directory entry to serve as a record slot directory entry 86, a virtual track slot header and virtual track information block are assigned to the record slot directory entry from a pool 96 located on one or more reserved segments of cache 58. The virtual control block can be dynamically allocated from free segments and space does not have to be reserved when the control unit is initialized. A pointer to the virtual track slot header 100 is placed in the record slot directory entry 86. Virtual track slot header 100 is part of a set 98 also including a virtual track information block 102. Virtual track slot header 100 includes a pointer to the virtual track information block and the addresses of assigned segments. Virtual track information block 102 includes addresses of records in cache. All of the records within a record slot must be of the same length, contain no key fields and have monotonically incrementing consecutive record numbers. Track information blocks and virtual track information blocks indicate if a record is modified.

Block 104 is representative of the structure of cache segment allocated for record caching. Records, while they may belong to different tracks, will be of the same length and format, i.e. a pseudo count field giving a device and physical address for the record, the record and error correcting or detecting code. At the end of a segment is a segment information block which is illustrated in greater detail in block 106. Within the segment information block 106 is a local, doubly linked most recently used/least recently used list of the active records in the segment. Also in the segment information block is a record time stamp for each active record in the segment. Free records within the segment are maintained in a separate free list.

Interaction of the various data structures is best understood with reference to the flow charts of FIGS. 5A and 5B, FIG. 6, and FIG. 7.

Figure 5A:
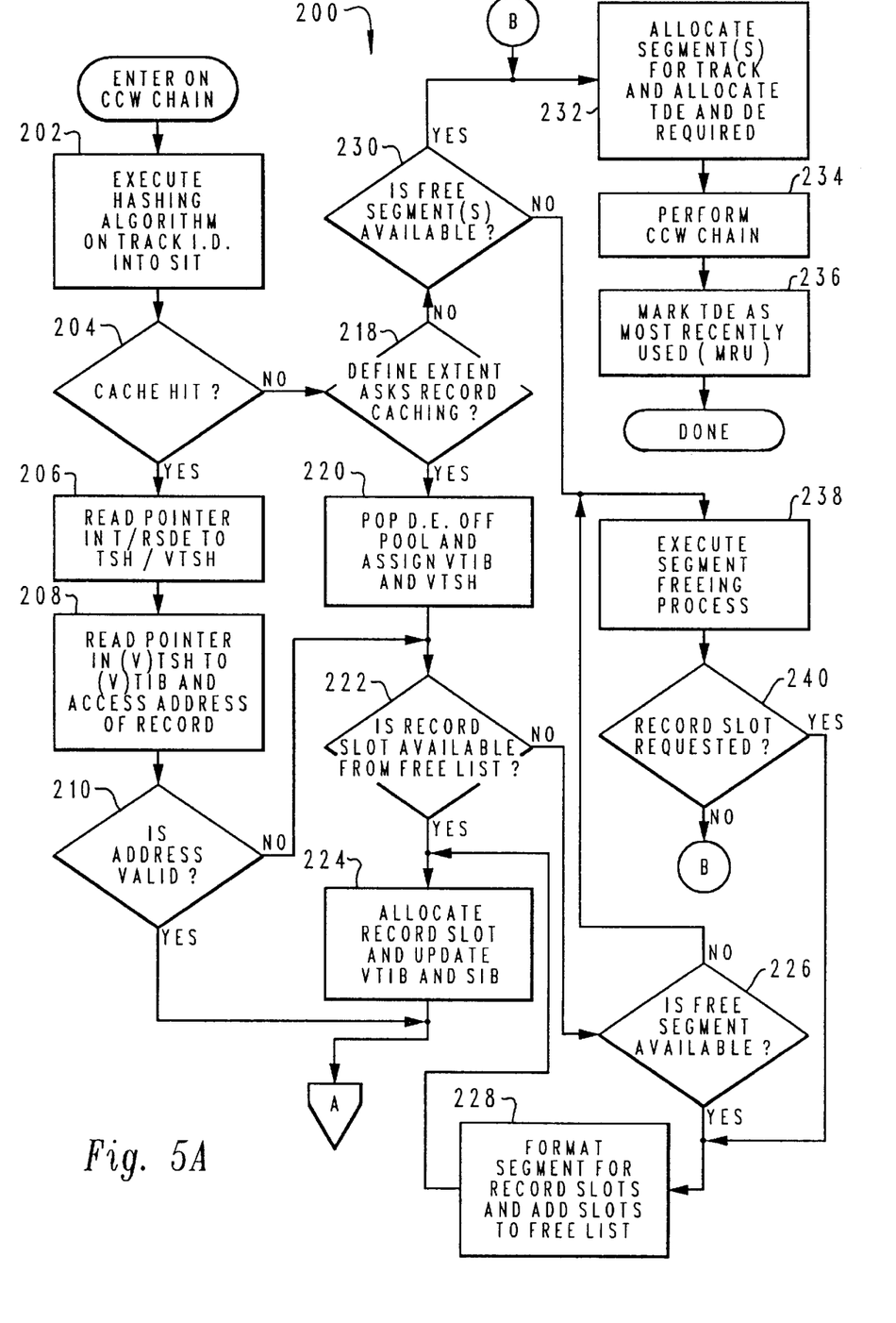
FIGS. 5A and 5B are flow charts describing a sequence of operations of the storage controller in response to a channel command chain.
Figure 5B:
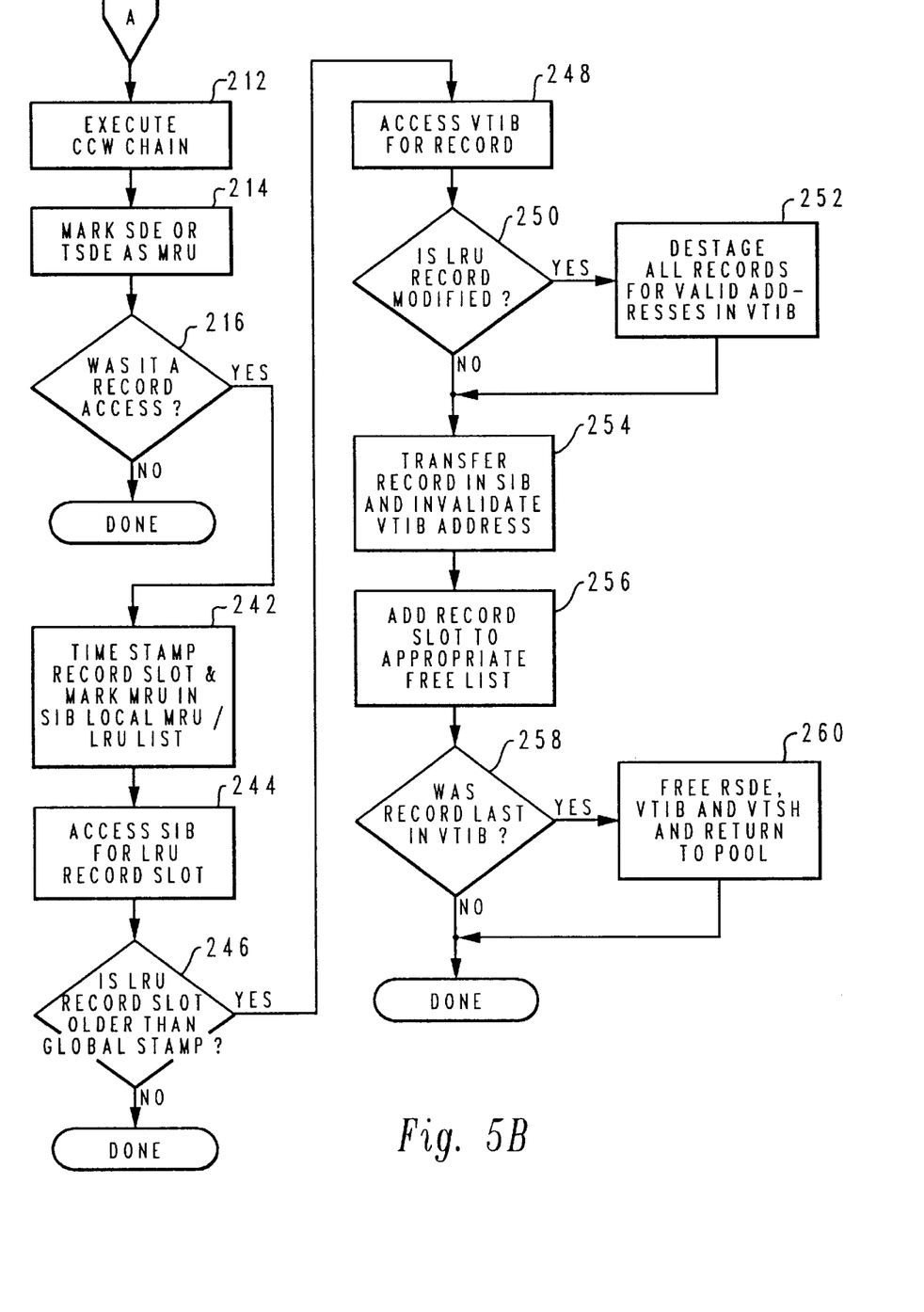

Process 200 of FIGS. 5A and 5B is entered upon receipt of a channel command word chain from a host computer by storage controller 12. Storage controller 12 executes the process in handling a request from a host computer for access to a record on a direct access storage device or creation of a record for storage on a direct access storage device. The chain may modify an existing record, create a new record or read an existing record. The record may or may not be in cache 58.

To determine presence of a record or track in cache, step 202 is executed to process a hashing algorithm on the direct access storage device and physical address for a track. The hashing algorithm will return an offset into the scatter index table 80 which in turn provides an index to a track directory entry or record directory entry, if present. Return of such an index is taken by step 204 to be a cache hit. As explained below, such a cache hit is subject to validation.

Following the YES branch from decision block 204, process step 206 is executed to read a pointer in the track slot directory entry or record slot directory entry to a track slot header or virtual track slot header, respectively. Next, step 208 is executed to read the pointer in the track slot header or virtual track slot header to a track information block or virtual track information block. The (virtual) track information block holds an address cache 58 for the record. Next, step 210 is executed to determine if the address is valid. As stated above, when record caching is in use, a given record from a track may or may not be present in cache. Thus while a cache hit may occur at step 204 because a record slot directory entry for the track of a particular record is present, the record itself may or may not be in cache. If it is not present, the address returned by step 208 will be invalid. If the record is present, the address returned by step 208 will be valid.

Following the YES branch from step 210, step 212 is executed to process the channel command word chain on the record. Next, step 214 is executed to update the global most recently used/least recently used list. For a record caching situation, this involves marking the segment directory entry for the segment on which the record was cached as most recently used. If track caching is in use respecting the record, the track slot directory entry is marked as most recently used. Marking includes insertion of a time stamp in the appropriate directory entry.

Next, step 216 is executed to determine if record caching or track caching is in use. If track caching is in use no further operation is required and the process can be exited. If record caching is in use additional processing is required for updating a local most recently used list for the cache segment on which the record was stored.

Returning now to step 204, the steps of the process responsive to non-occurrence of a cache hit are considered. Following the NO branch from step 204, step 218 is executed. At step 218 the define extent byte from the channel command word chain is interrogated to determine if record caching is to be used. If YES, step 220 is executed to pop a directory entry off of a pool list for creating a record slot directory entry and assignment of a virtual track slot header and virtual track information block to the new record slot directory entry is made. Next, at step 222 it is determined if a record slot is available from a free list for the size of record required. Execution of decision block 222 also follows step 210 after return of an invalid address. Following the YES branch from step 222, step 224 is executed to allocate a record slot for the record and to update the appropriate virtual track information block and segment information blocks. Again the process proceeds by step 212 as described above. If at step 222 it is determined that a record slot was not available from the free list, the NO branch is followed to step 226 where it is determined if a segment is available from the free segment list. If YES, the segment can be formatted for record slots and the slots added to the free list for the appropriate size at step 228. Step 224 may be then executed to allocate a record slot for the record.

Returning to step 218, the NO branch is followed when track caching has been requested in the define extent. Step 230 is then executed to determine if free segments are available for creation of a track slot. If YES, step 232 is executed to allocate segments for the track slot and to allocate a track slot directory entry and supplementary track directory entries as required. Next, at step 234, the channel command word chain is executed. Next, at step 236 the new track slot directory entry is marked as most recently used and the process is exited.

If, however, at step 230, free segments were not available for caching the track, the NO branch is followed to step 238. Step 238 also follows upon a determination at step 226 that no free segment was available. Step 238 represents execution of a segment freeing process as described below in relation to FIG. 6. Upon completion of step 238 segments will be available for allocation to record caching or track caching. Decision step 240 represents return of execution of the process to the appropriate point in the program, i.e. step 228 for record caching or step 232 for track caching.

Execution of the segment freeing process represented by block 238 should rarely be required to make record slots available. A record slot freeing process is executed upon completion of each access to a record. Returning to step 216 and following the YES branch to step 242, the record slot freeing process is initiated. At step 242 the record slot just accessed is stamped as most recently used in the appropriate segment information block on the local most recently used/least recently used list of a segment information block. The record slot time stamp is also updated. Next, the segment information block is accessed to determine the least recently used record in the segment information block. At step 246, the time stamp of the least recently used record slot is compared with the global time stamp 94. The source of the global time stamp is described below. If the least recently used record slot has been used since the global time stamp no further action is required and the process is exited.

However, if the least recently used record slot time stamp is older than the global time stamp 94 the record slot is freed. Following the YES branch from 246, step 248 is executed to access the virtual track information block for the record in the record slot. The access process requires return through the scatter index table and record slot directory entry data structure as described above. At step 250 is it determined if the least recently used record is a modified record. If the record is modified the YES branch is followed to step 252. Step 252 represents a number of process steps taken to destage all records for valid addresses in a virtual track information block. A modified record is a record in cache which is incongruent with its associated record on a track in a direct access storage device, or a record that is entirely new. The modified record in cache is always the more current record. Before such a record can be removed from cache, the permanent record in the direct access storage device must be updated to reflect the modification. For mechanical reasons this is a time consuming process, involving movement of a magnetic transducer in the direct access storage device to a position over the appropriate track and writing of the date from the cache record into the appropriate track position. As long as all of these mechanical steps are being undertaken, it is efficient to destage all of the records of a track which are in cache. Step 252 represents this process.

Upon completion of the destage process and along the NO branch from 250, step 254 is executed to remove the record from the segment information block MRU list and to invalidate the virtual track information block address for the record. Next, step 256 is executed to add the record slot to the appropriate free list in the shared control array 64. Next, at step 258 it is determined if the record was the last record for its track in the virtual track information block. If it was, the record slot directory entry, virtual track information block and virtual track header slot are freed and returned to a pool for later use at step 260. Following the NO branch from step 258, or following step 260, the process is completed and may be exited.

Figure 6:
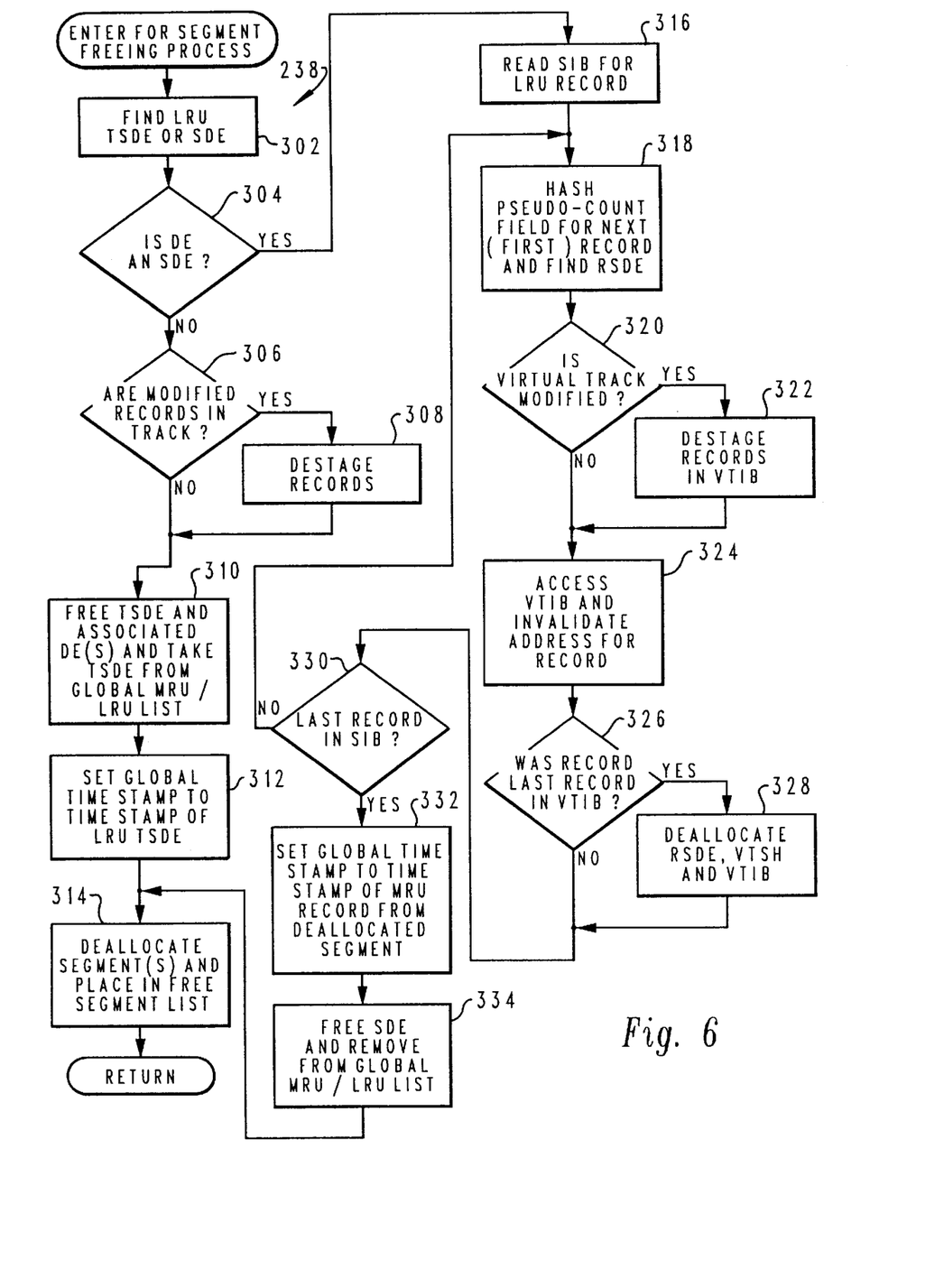
FIG. 6 is a flow chart describing a sequence of operations of the storage controller taken to free segments of a memory device for caching of records or tracks in response to a channel command chain.

The segment freeing process of block 238 is illustrated in greater detail in FIG. 6. The subprocess is entered at step 302 which is executed to find the least recently used track slot directory entry or segment directory entry in the global MRU/LRU list 85. Next, at step 304 it is determined if the directory entry was a segment directory entry. The case where it is not is the simpler case and will be considered first.

Following the NO branch from step 304, step 306 is executed. Step 306 is executed to determine if modified records are present in the track. The presence of such modified records will require a destage process as represented by step 308. Upon completion of the destage process, or if no records are modified, step 310 is executed to free the track slot directory entry and such associated track directory entries present and to remove the track slot directory entry from the global most recently used/least recently used list 85. Next, step 312 is executed to set the global time stamp to the time stamp of the just removed least recently used track slot directory entry. Next, at step 314 the segment is deallocated and placed in the free segment list. It will be understood by those skilled in the art that the process at block 238 is laid out for to illustrate freeing of a single segment, but execution can be repeated to free several segments if required.

Returning to step 304 and the case where a directory entry was a segment directory entry, the YES branch is followed to step 316. At step 316 the segment information block for the segment identified with the segment directory entry is read to locate the least recently used record. At step 318 the pseudo count field for the record is hashed to find the record slot directory entry for the record. Again, several subsidiary steps occur at this point involving return through the scatter index table to find the appropriate record slot directory entry. From the record slot directory entry the virtual track information block can be located and examined with execution of step 320. If the virtual track includes modified records step 322 is executed to destage all of the records from the virtual track information block. Step 324 is executed along the NO branch from step 320 or following step 322. In step 324 the virtual track information block is accessed to invalidate the address for the least recently used record. At step 326 it is determined if the record was the last record in the virtual track information block. If it was, the record slot directory entry, virtual track slot header and virtual track information block are deallocated with execution of step 328. Next, at step 330 it is determined if the last record in the segment information block has been processed. If not the process returns to step 318.

Once the last record in a segment information block has been processed, step 332 is executed to update the global time stamp to the time stamp of the most recently used record in the segment. At step 334, the segment directory entry is freed and removed from the global MRU/LRU list 85. Next, step 314 is executed to deallocate the segment and place the segment in the free segment list. The process now returns to step 240 of FIG. 5A.

An alternative embodiment includes additional features provided by allocation of record slots starting at the beginning of a segment and use of segmentation to continuously span segments. Contrasted with the preferred embodiment, this modification of the data structures makes allocation management simpler. After each record slot is allocated, the starting address for the next record slot and the space remaining in the current segment are calculated and saved for the next allocation request. If the next record slot to allocate does not fit in the segment, a new segment is obtained from the segment free list and segmentation is used to span the segments. Initially cache space will be used very efficiently. Records are allocated one after another regardless of record size. Accordingly the differentiated record slot free lists are dispensed with. However, eventually fragmentation results because records span all segment boundaries. This forces the segment directory entry to have pointers to the previous and following logical segments as well as pointers to the first and last pseudo count field within the segment. There will be no segment information block to maintain a local most recently used/least recently used list of record slots in the segment. Accordingly, low access frequency records in the cache will not be reallocated. Potentially, a segment information block could be allocated in a different portion of cache, in a manner analogous as used with the virtual track slot header. However, even if present there, space will not exist for maintenance of a record slot free list because the segment directory entry needs pointers to locate pseudo count fields for all records in the segment. Finally bottlenecks may result in freeing segments because the only way to free record slots is to free whole segments which are filled with records.

Another embodiment assigns one segment to each track using record slots. All records from a track would be placed in the same segment, but a complete track image is not required. When a segment is filled, either the oldest record slot for the track is overwritten or a new segment is allocated and segmentation is used to span between segments. This structure is more fully compatible with conventional track caching. The record slot directory entry structures are dispensed with and track directory entries, virtual track directory entries and virtual track information blocks allocated in place at the beginning of the segment. The virtual track information block now contains the local MRU/LRU list for the records present on the track. A disadvantage of the implementation is that the number of tracks containing record slots is limited by the number of segments. Such a system can exhibit considerable internal fragmentation in that a full 16 kilobyte segment is required even if only one small record is cached from a track.

Figure 7:
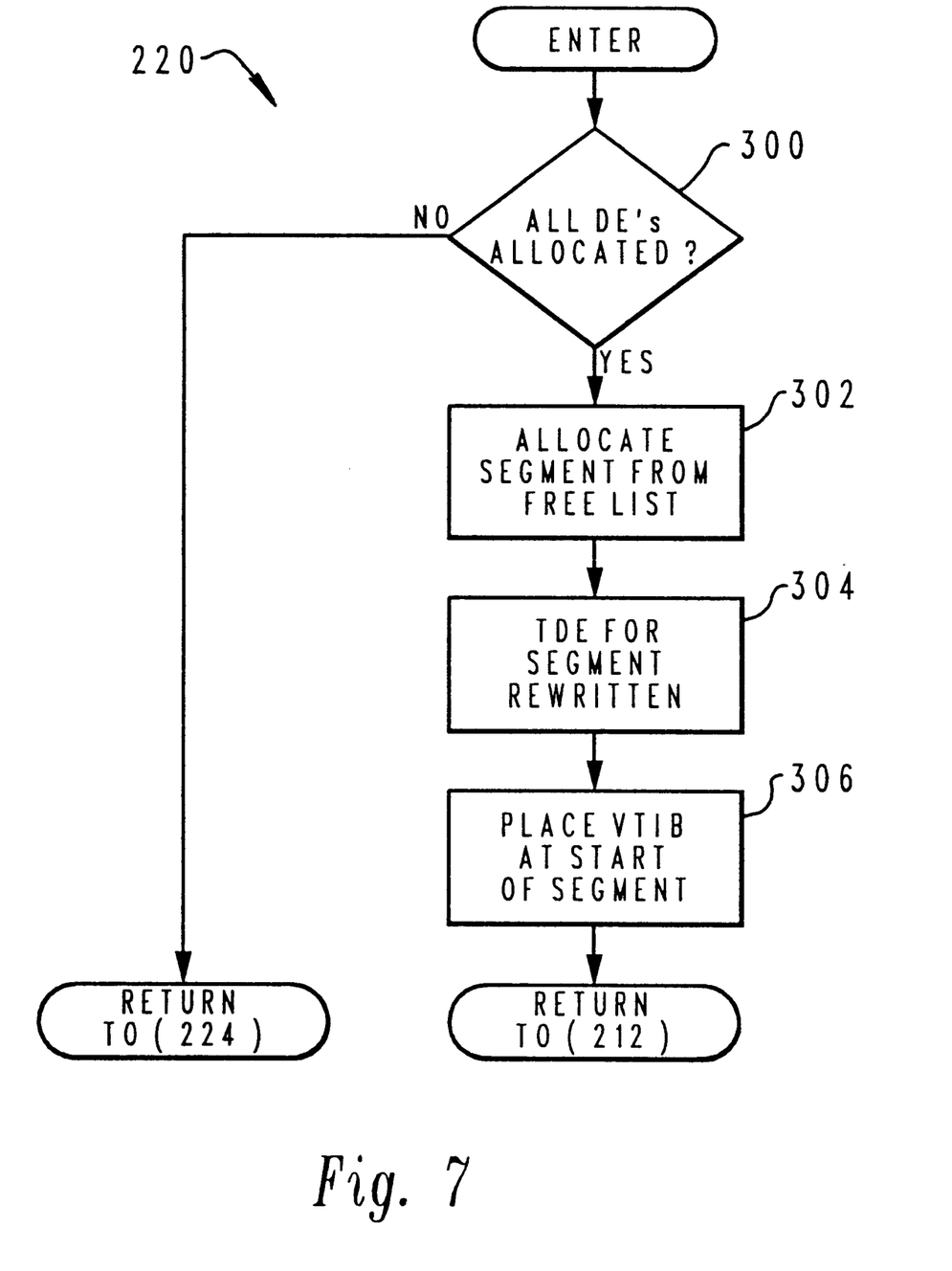
FIG. 7 is a flow chart describing a sequence of operations of the storage controller taken in response to exhaustion of unallocated directory entries for use in record caching.

However, a modification of this embodiment can be used to cover the situation in the preferred embodiment when a record slot is requested but all record directory entries are in use. The modification would also cover thee circumstance where a record slot was requested but its length was greater than 10 kilobytes. FIG. 7 illustrates implementation of the process where no directory entries are available for allocation as record directory entries. The circumstance is detected at step 300. If directory entries are available, the process simply returns to step 224. At step 302 a segment is allocated from the segment free list. At step 304 a track directory entry already allocated to the segment is taken. Next, at step 306 a virtual track information block is placed at the start of the segment. No local MRU/LRU list is provided. Slots are not freed from the segment for inclusion in a record slot free list because of the limitation that the record slots be used for records from a particular track.

While the invention has been particularly shown and described with reference to a preferred embodiment, it will be understood by those skilled in the art that various changes in form and detail may be made therein without departing from the spirit and scope of the invention.

What is claimed is:

1. A data storage system for providing dynamic allocation of space in an upper level store of a multiple level memory between record and track caching, said data storage system comprising:

an upper level store having a plurality of segments for caching records and tracks from a lower level store;

a track slot directory entry associated with each segment within said upper level store which includes a cached track therein and wherein each cached track includes a plurality of records which are addressed as a group;

a segment directory entry associated with each segment within said upper level store which includes a cached record therein and wherein each cached record is addressed individually;

a most recently used list containing both track slot directory entries and segment directory entries in order of utilization; and allocation control means for dynamically controlling allocation of a portion of required segments within said upper level store for utilization for storage of records and allocation of a remainder of required segments within said upper level store for utilization for storage of tracks in response to entries within said most recently used list wherein allocation of which portion of required segments within said upper level store are utilized for storage of records and wherein which portion of required segments within said upper level store are utilized for storage of tracks may be dynamically altered based upon utilization experience.

2. The data storage system according to claim 1, further including a free segment list which lists free segments within said upper level store available for utilization.

3. The data storage system according to claim 2, further including a free record slot list which lists segments within said upper level store available for caching of records.

4. The data storage system according to claim 2, further including means for freeing a selected segment within said upper level store identified by means of said most recently used lists in response to exhaustion of free segments.

5. The data storage system according to claim 1, further including a global most recently used list containing records cached within said upper level store in order of utilization.

6. The data storage system according to claim 5, further including means for freeing a selected record within said upper level store identified by means of said global most recently used list.

7. A method of providing dynamic allocation of space in an upper level store of a multiple level memory between record and track caching, wherein said upper level store includes multiple segments, said method comprising the steps of:

associating a track slot directory entry with each segment within said high level store which includes a cached track therein and wherein each cached track includes a plurality of records which are addressed as a group;

associating a segment directory entry with each segment within said high level store which includes a cached record therein and wherein each cached record is addressed individually;

maintaining a most recently used list containing both track slot directory entries and segment directory entries in order of utilization; and dynamically controlling allocation of a portion of required segments within said upper level store for utilization for storage of records and allocation of a remainder of required segments within said upper level store for utilization for storage of tracks in response to entries within said most recently used list wherein allocation of which portion of required segments within said upper level store are utilized for storage of records and wherein which portion of required segments within said upper level store are utilized for storage of tracks may be dynamically altered based upon utilization experience.

8. The method according to claim 7, further including the step of maintaining a free segment list which lists free segments within said upper level store available for utilization.

9. The method according to claim 8, further including the step of maintaining a free record slot list which lists segments within said upper level store available for caching of records.

10. The method according to claim 8, further including the step of freeing a selected segment within said upper level store identified by means of said most recently used list in response to exhaustion of free segments.

11. The method according to claim 7, further including the step of maintaining a global most recently used list containing records cached within said upper level store in order of utilization.

12. The method according to claim 7, further including the step of freeing a selected record within said upper level store identified by means of said global most recently used list.

* * * * *

UNITED STATES PATENT AND TRADEMARK OFFICE
CERTIFICATE OF CORRECTION

PATENT NO. : 5,991,775
DATED : November 23, 1999
INVENTOR(S) : Beardsley, et. al.

It is certified that error appears in the above-indentified patent and that said Letters Patent is hereby corrected as shown below:

Column 8, lines 36-37, please delete "Marking includes insertion of a time stamp in the appropriate directory entry-.

Signed and Sealed this

Twentieth Day of March, 2001

Attest:

NICHOLAS P. GODICI

*Attesting Officer*        *Acting Director of the United States Patent and Trademark Office*